US009003093B2

(12) United States Patent
Wong (10) Patent No.: US 9,003,093 B2
(45) Date of Patent: Apr. 7, 2015

(54) CONNECTOR APPARATUS AND ASSOCIATED METHOD FOR BRIDGING DATA BETWEEN DATA SOURCES AND DATA TARGETS

(75) Inventor: Eldon Wong, Vancouver (CA)

(73) Assignee: McKesson Financial Holdings, Hamilton (BM)

( * ) Notice: Subject to any disclaimer, the term of this patent is extended or adjusted under 35 U.S.C. 154(b) by 356 days.

(21) Appl. No.: 13/606,338

(22) Filed: Sep. 7, 2012

(65) Prior Publication Data

US 2014/0075073 A1    Mar. 13, 2014

(51) Int. Cl.
*G06F 13/22*    (2006.01)
*G06F 3/12*    (2006.01)

(52) U.S. Cl.
CPC .................. *G06F 3/1204* (2013.01)

(58) Field of Classification Search
CPC .................................................. G06F 3/1204
USPC .................... 710/220, 113–119, 305–315
See application file for complete search history.

(56) References Cited

U.S. PATENT DOCUMENTS

| | | |
|---|---|---|
| 4,868,866 A | 9/1989 | Williams, Jr. |
| 6,105,043 A | 8/2000 | Francisco et al. |
| 6,988,241 B1 | 1/2006 | Guttman et al. |
| 7,139,978 B2 | 11/2006 | Rojewski et al. |
| 7,421,654 B2 | 9/2008 | Wugoski |
| 7,426,688 B2 | 9/2008 | Serra et al. |
| 8,144,854 B2 * | 3/2012 | Rodman ................ 379/202.01 |
| 8,145,803 B2 | 3/2012 | Hwang et al. |
| 8,209,444 B2 | 6/2012 | Huang |
| 8,281,242 B2 | 10/2012 | Gomes et al. |
| 8,566,716 B2 | 10/2013 | Haynes et al. |
| 2006/0184710 A1 * | 8/2006 | Valdivia et al. ................ 710/315 |
| 2008/0034288 A1 | 2/2008 | Landar et al. |
| 2009/0100174 A1 | 4/2009 | Annareddy et al. |
| 2009/0169178 A1 | 7/2009 | Higgins et al. |

(Continued)

OTHER PUBLICATIONS

Crook. J.; "*Microsoft Patenting Multi-Screen, Multi-Touch Gestures;*" retrieved on Jun. 5, 2014 from <http://techcrunch.com/2011/08/25/microsoft-awarded-patents-for-multi-screen-multi-touch-gesture/>.

(Continued)

*Primary Examiner* — Raymond Phan
(74) *Attorney, Agent, or Firm* — Alston & Bird LLP (57) ABSTRACT

A connector apparatus and the associated method are provided for bridging data between entities, such as between data source(s) and data target(s). In a method, first and second data bridge connections are established between a connector apparatus and a data source and between a connector apparatus and a data target, respectively. Each data bridge connection includes a data pipe having one or more data flows with each data flow dedicated to a particular data type. The method includes sending a polling request from the connector apparatus to the data source via the first data bridge connection and receiving data from the data source over the first data pipe in response to the polling request. The method includes sending the received data to the data target over the second data pipe when the data target has subscribed to the data received from the data source over the first data pipe.

20 Claims, 6 Drawing Sheets

(56) References Cited

U.S. PATENT DOCUMENTS

| | | | |
|---|---|---|---|
| 2009/0198856 A1* | 8/2009 | Habben | 710/305 |
| 2010/0125653 A1* | 5/2010 | Cherian et al. | 709/223 |
| 2010/0296505 A1 | 11/2010 | Kissinger et al. | |
| 2011/0035523 A1* | 2/2011 | Feero et al. | 710/110 |
| 2011/0214061 A1 | 9/2011 | King et al. | |
| 2011/0289487 A1 | 11/2011 | Song | |
| 2012/0047306 A1* | 2/2012 | Mitsubayashi | 710/306 |
| 2012/0054604 A1 | 3/2012 | Warncke-Wang | |
| 2012/0131645 A1 | 5/2012 | Harm | |
| 2012/0271472 A1 | 10/2012 | Brunner | |
| 2014/0189188 A1* | 7/2014 | Whitby-Strevens et al. | 710/310 |

OTHER PUBLICATIONS

Krcha, T; "*Multicast Explained in Flash 10.1* P2P;" Flash Realtime.com; retrieved on Jun. 5, 2014 from <http://web.archive.org/web/20120513144832/http://www.flashrealtime.com/multicast-explained-flash-101-p2p/>.

"Cirrus;" Adobe Labs; retrieved on Jun. 5, 2014 from <http://labs.adobe.com/technologies/cirrus/>.

Gestureworks; retrieved on Jun. 5, 2014 from <http://gestureworks.com/>.

Office Action for U.S. Appl. No. 13/612,285; dated May 8, 2014.

Office Action from U.S. Appl. No. 13/612,285 dated Feb. 25, 2015.

* cited by examiner

CONNECTOR APPARATUS AND ASSOCIATED METHOD FOR BRIDGING DATA BETWEEN DATA SOURCES AND DATA TARGETS

TECHNOLOGICAL FIELD

An example embodiment to the present invention relates generally to techniques for sharing data between entities, such as between one or more data sources and one or more data targets.

BACKGROUND

Applications have typically been developed for implementation by a single device. In conjunction with the capture, processing and viewing of medical images, for example, a first application may be developed for a desktop computer to provide a radiology information system (RIS), a second application may be developed for a tablet computer to implement a picture archiving and communication system (PACS) viewer and a third application may be developed for a smart phone to implement an absolute coordinate poller. While the focus upon developing an application for a single device facilitates the development of the application and provides many different application development possibilities, the functionality provided by the application may be at least somewhat limited by the device for which the application was developed and the functionality of the device may be correspondingly somewhat limited by the applications that are developed therefore.

Users oftentimes have multiple devices, such as a smartphone, a tablet computer, a laptop computer, a desktop computer, an electronic reader (e-reader) and the like. Additionally, many of these devices are mobile and, as such, may be utilized in a variety of different situations. Further, at least some of the devices may include one or more sensors with devices developed for future use being expected to include even a greater number and variety of sensors for providing data and context to the applications executed by the respective devices. By leveraging the information provided by the various sensors as well as the applications executed by the various devices, a user might take advantage of enhanced functionality and an improved user experience. Returning to the foregoing example, interaction between the desktop computer executing the first application to provide a RIS, the tablet computer executing the second application to implement a PACS viewer and the smart phone executing the third application to implement an absolute coordinate poller may provide an integrated RIS-PACS that is capable of determining the relative position of the user holding the smartphone with the absolute coordinate poller, thereby providing enriched and increased functionality. However, in order to share sensor data collected by sensors of the various devices and to allow the applications executed by the various devices to interact, improved techniques for sharing data between the devices must be developed.

However, the techniques for sharing data between devices and between applications executed by the various devices have previously been limited for various reasons including as a result of their implementation for specific purposes or functions and/or their development for a particular device. Additionally, techniques for sharing data between devices have sometimes required that the data be specified in advance, thereby making the techniques for sharing data more rigid and less extensible than desired in many instances. Further, techniques for sharing data between multiple devices as well as between applications executed by multiple devices have had difficulties, in some instances, identifying the addition of new devices and the departure of other devices, thereby limiting the adaptability and versatility of such techniques.

BRIEF SUMMARY

A connector apparatus and the associated method for bridging data between entities are provided according to an example embodiment of the present invention. The connector apparatus and associated method of an example embodiment facilitate interaction between devices including the sharing of data between devices, thereby enhancing cooperation between applications executed by the various devices. The connector apparatus and associated method of an example embodiment are flexible in design so as not to be limited to a specific purpose or function and, similarly, so as not to be limited to a particular device. Further, the connector apparatus and associated method of an example embodiment may be utilized in conjunction with a wide variety of different types of data which need not be defined in advance, thereby improving the dynamic nature and extensibility of the connector apparatus and associated method. By permitting devices and applications executed by the various devices to cooperate in a more seamless and integrated manner, a user may enjoy enhanced functionality.

In one embodiment, a method for bridging data between entities is provided that includes establishing a first data bridge connection between a connector apparatus and a data source. The first data bridge connection includes a first data pipe that is comprised of one or more data flows. Each of the data flows associated with the first data pipe is dedicated for sending a first particular data type. The method of this embodiment also includes establishing a second data bridge connection between the connector apparatus and a data target. The second data bridge connection includes a second data pipe comprised of one or more data flows. Each of the one or more data flows associated with the second data pipe is dedicated for sending a second particular data type. The method of this embodiment also includes sending a polling request from the connector apparatus to the data source via the first data bridge connection and receiving data from the data source over the first data pipe in response to the polling request. The method of this embodiment also includes sending the received data to the data target over the second data pipe in an instance in which the data target has subscribed to the data received over the first data pipe. For example, the data target may subscribe to receive all of the data provided via the first data pipe, only certain ones of the data flows provided via the first data pipe, e.g., only certain ones of the first particular data types, or all of the data from one or more particular data sources that is provided via the first data pipe.

The method of one embodiment may establish the first data bridge connection based at least in part on a connection request from the data source. The connection request from the data source may include a specification for the first data pipe defining the one or more data flows associated with the first data pipe. The method of this embodiment may also establish the second data bridge connection based at least in part on a connection request from the data target. The connection request from the data target may include a specification for the second data pipe defining the one or more data flows associated with the second data pipe.

The establishment of the first data bridge connection may include establishing a plurality of first data bridge connections with respective ones of a plurality of data sources. In this embodiment, the method may send the polling request by sending the polling request from the connector apparatus to the plurality of data services via respective first data bridge connections. The method of this embodiment may receive data from a plurality of data sources over respective data pipes in response to the polling request. Further, the method of this embodiment may aggregate data flows of the same type that are received from two or more data sources prior to sending the data to one or more data targets via respective second data bridge connections.

The method of one embodiment may establish the second data bridge connection by establishing a plurality of second data bridge connections with respective ones of a plurality of data targets. The method of this embodiment may send the received data to the data target by sending the received data to a subset of the data targets including the data targets that are connected to the connector apparatus via the second data bridge connections and that have subscribed to the data received from the data source over the first data pipe. The method of one embodiment may receive data from the data source by receiving data in accordance with a received data structure that includes a context identifier, one or more data flow identifiers and one or more data values. The method of one embodiment may also include receiving an indication as to a connection or disconnection of the data source or data target and informing one or more other data sources or one or more other data targets of the connection or the disconnection. A computer program product may also be provided that includes at least when non-transitory computer-readable storage medium having computer-executable program code in portions stored therein with the computer-executable program code portions including program code instructions configured to perform the foregoing method.

In another embodiment, a connector apparatus is provided for bridging data between entities. The connector apparatus includes a processing circuitry configured to establish a first data bridge connection with a data source. The first data bridge connection includes a first data pipe that is comprised of one or more data flows. Each of the one or more data flows associated with the first data pipe is dedicated for sending a first particular data type. The processing circuitry of this embodiment is also configured to establish a second data bridge connection with the data target. The second data bridge connection includes a second data pipe comprised of one or more data flows. Each of the one or more data flows associated with the second data pipe is dedicated for sending a second particular data type. The processing circuitry of this embodiment is also configured to send a polling request to the data source via the first data bridge connection and to receive data from the data source over the first data pipe in response to the polling request. The processing circuitry of this embodiment is also configured to send the received data to the data target over the second data pipe in an instance in which the data target has subscribed to the data received over the first data pipe. For example, the data target may subscribe to receive all of the data provided via the first data pipe, only certain ones of the data flows provided via the first data pipe or all of the data from one or more particular data sources that is provided via the first data pipe.

The processing circuitry of one embodiment is configured to establish the first data bridge connection based at least in part on a connector request from the data source. In this regard, the connection request from the data source may include a specification for the first data pipe defining the one or more data flows associated with the first data pipe. The processing circuitry of this embodiment may also to be configured to establish the second data bridge connection based at least in part on a connection request from the data target. The connection request from the data target may include a specification for the second data pipe defining the one or more data flows associated with the second data pipe.

The processing circuitry of another embodiment may be configured to establish the first data bridge connection by establishing a plurality of first data bridge connections with respective ones of a plurality of data sources. The processing circuitry of this embodiment may also be configured to send the polling request to a plurality of data sources via respective first data bridge connections. The processing circuitry of this embodiment may also be configured to receive data from the plurality of data sources over respective data pipes in response to the polling request. Further, the connector apparatus of this embodiment may be configured to aggregate the data flows of the same type that are received from two or more data sources prior to sending the data to one or more data targets via respective second data bridge connections.

The processing circuitry of one embodiment may be configured to establish the second data bridge connection by establishing a plurality of second data bridge connections with respective ones of a plurality of data targets. The processing circuitry of this embodiment may be configured to send the received data to the data target by sending the received data to a subset of the data targets including the data targets that are connected to the connector apparatus via second data bridge connections and that have subscribed to the data received from the data source over the first data pipe. The processing circuitry of one embodiment may be configured to receive data from the data source by receiving data in accordance with a received data structure that includes a context identifier, one or more data flow identifiers and one or more data values. The processing circuitry of one embodiment may be further configured to receive an indication as to a connection or disconnection of a data source or a data target and to inform one or more other data sources or one or more other data targets of the connection or the disconnection.

In a further embodiment, a system for bridging data between entities is provided that includes a connector apparatus, a data source and a data target. The data source is connected to the connector apparatus via a first data bridge connection. The first data bridge connection includes a first data pipe comprised of one or more data flows. Each of the one or more data flows associated with the first data pipe is dedicated for sending a first particular data type. The data target is connected to the connector apparatus via a second data bridge connection. The second data bridge connection includes a second data pipe comprised of one or more data flows associated with the second data pipe. Each of the one or more data flows associated with the second data pipe is dedicated for sending a second particular data type. In this embodiment, the connector apparatus is configured to send the polling request to the data source via the first data bridge connection. The data source is configured to provide data to the connector apparatus over the first data pipe in response to the polling request. A connector apparatus of this embodiment is further configured to send the received data to the data target over the second data pipe in an instance in which the data target has subscribed to the data received over the first data pipe.

The data target of one embodiment is further configured to subscribe to data of the second particular data type. The system of one embodiment also includes a plurality of data sources connected to the connector apparatus via respective ones of a plurality of first data bridge connections. The connector apparatus of this embodiment is configured to send the polling request to the plurality of data sources via respective first data bridge connections. The plurality of data sources are configured to provide data over respective data pipes in response to the polling request. The connector apparatus of this embodiment is further configured to aggregate data flows of the same type that are received from two or more data sources prior to sending the data to one or more data targets via respective second data bridge connections. The system of one embodiment also includes a plurality of data targets connected to the connector apparatus via respective ones of a plurality of second data bridge connections. The connector apparatus is configured to send the received data to a subset of data targets including data targets that are connected to the connector apparatus via the second data bridge connections and that have subscribed to the data received from the data source over the first data pipe. The connector apparatus of one embodiment is also configured to receive an indication as to a connection or a disconnection of a data source or a data target and to inform one or more other data sources or one or more other data targets of the connection or the disconnection.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
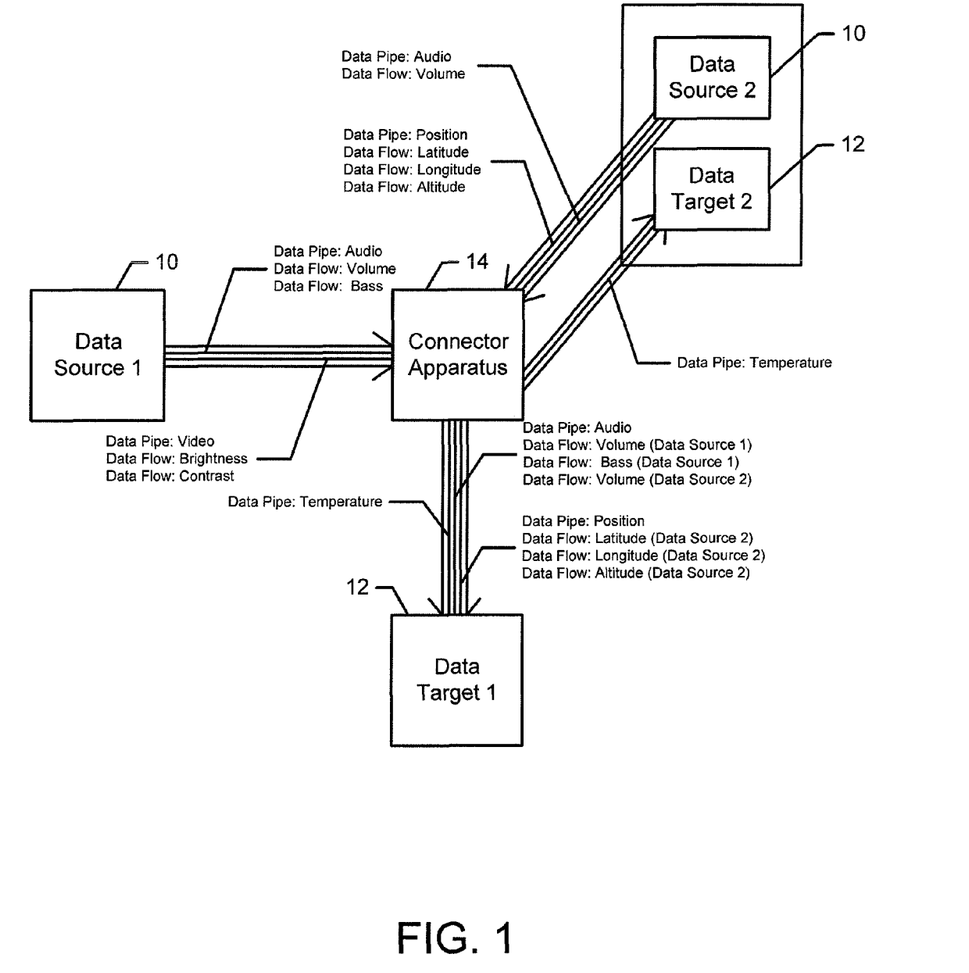
FIG. 1 is a block diagram of a system for bridging data between entities in accordance with an example embodiment of the present invention.

A system for bridging data between entities is shown in FIG. 1. In this embodiment, one or more data sources 10 may provide data to one or more data targets 12 via a connector apparatus 14. The data sources may be any of a wide variety of computing devices, such as a tablet computer, a laptop computer a desktop computer, a mobile terminal, e.g., a smartphone, a personal digital assistant (PDA), etc., an e-reader, a sensory component such as the Disney Touché™ sendor, or the like. The data targets may also be any of a wide variety of computing devices including, for example, a tablet computer, a laptop computer a desktop computer, a mobile terminal, e.g., a smartphone, a PDA, etc., an e-reader, a sensory component such as the Disney Touché™ sendor, or the like. While the various devices that interact with the connector apparatus may be a dedicated data source, e.g., Data Source 1, or a dedicated data target, e.g., Data Target 1, one or more of the devices that interact with the connector apparatus may serve both as a data source and as a data target, e.g., Data Source 2 and Data Target 2.

The connector apparatus 14 is also embodied by a computing device, such as a desktop computer, a laptop computer, a tablet computer, a server (such as a server supporting a web service, a cloud service, etc.) or the like. Although the connector apparatus may be distinct from the data sources 10 and the data targets 12, the connector apparatus of one embodiment may be co-located or otherwise embodied by one of the data sources or one of the data targets.

Figure 2:
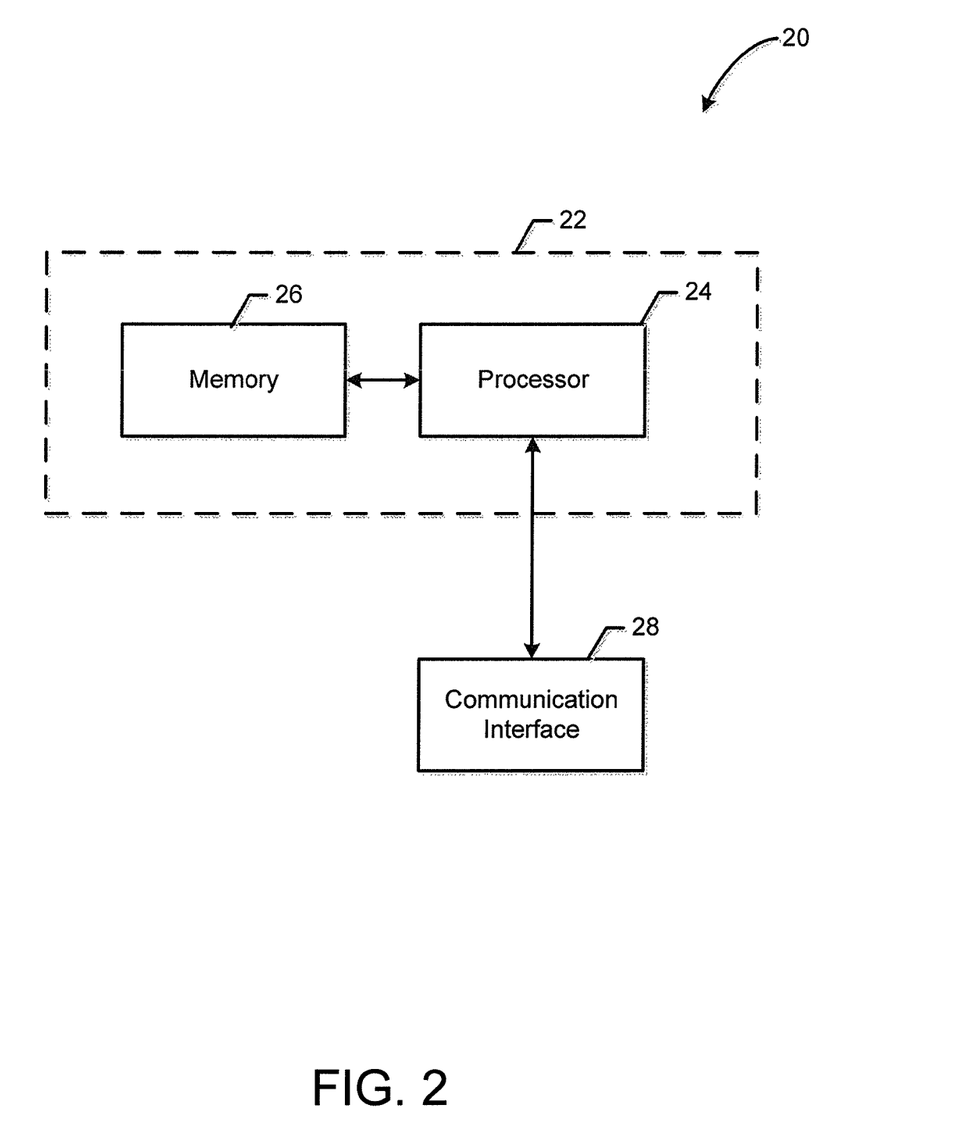
FIG. 2 is a block diagram of an apparatus that may be embodied by a connector apparatus, a data source or a data target and that may specifically configured in accordance with an example embodiment of the present invention.

Referring now to FIG. 2, an apparatus 20 that may be embodied by a computing device and that may be specifically configured to function as the connector apparatus 14, a data source 10 or a data target 12 is provided. The apparatus may include or otherwise be in communication with processing circuitry 22 that is configurable to perform actions in accordance with an example embodiment described herein. The processing circuitry may be configured to perform data processing, application execution and/or other processing and management services. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 26 that may be in communication with or otherwise control a communication interface 28. As such, the processing circuitry may be embodied as a circuit chip (e.g., an integrated circuit chip) configured (e.g., with hardware, software or a combination of hardware and software) to perform operations described herein.

The communication interface 28 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network and/or any other device or module in communication with the processing circuitry, such as between the connector apparatus 14, one or more data sources 10 and/or one or more data targets 12. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Referring again to FIG. 1, a first data bridge connection is established between connector apparatus 14 and each data source 10. Additionally, a second data bridge connection is established between a connector apparatus and each data target 12. The data bridge connections provide a path via which data may be transferred from a data source to the connector apparatus and, in turn, from the connector apparatus to a data target. Each data bridge connection, be it with a data source or data target, includes at least one data pipe, also referenced as a data highway. Each data pipe that is associated with a data source or that is associated with a data target that is being fed by a corresponding data source includes one or more data flows, also referenced as data lanes. A data pipe is a structure that allows data flows to be grouped by context such that the data that is sent via a respective data pipe has the same context. Additionally, each of the data flows associated with a respective data pipe is dedicated for sending a particular type of data. In other words, a data pipe is associated with or dedicated to a respective context with the data flows that comprise the data pipe being particular types of data of the respective context. Various types of data may be shared by the connector apparatus between the data source(s) and the data target(s) including, for example, various types of sensor data.

By way of example, the first data bridge connection between data source 10 and the connector apparatus 14 of FIG. 1 includes first and second data pipes. The first data pipe is associated with audio and the second data pipe is associated with video. In other words, the context of the first data pipe is audio and the context of the second data pipe is video. Within the first data pipe is a data flow associated with volume and a data flow associated with bass, while within the second data pipe is a first data flow associated with brightness and a second data flow associated with contrast. Continuing with this example, the second data source has a first data bridge connection with the connector apparatus that also includes two data pipes, namely, a first data pipe associated with position and a second data pipe associated with audio. In this embodiment, the first data pipe includes a first data flow associated with latitude, a second data flow associated with longitude and a third data flow associated with altitude. Additionally, the second data pipe that is associated with audio includes a single data flow associated with volume. In regards to the data targets 12, a second data bridge connection is established between the connector apparatus and a first data target. This second data bridge connection includes three data pipes including a first data pipe associated with temperature, a second data pipe associated with position and a third data pipe associated with audio. Although the first data pipe associated with temperature does not include any data flow since none of the data sources provide temperature data, the second data pipe between the connector apparatus and the first data target includes a first data flow associated with latitude, a second data flow associated with longitude and a third data flow associated with altitude. Further, the third data pipe between the connector apparatus and the first data target includes a first data flow associated with volume from the first data source, a second data flow associated with bass from the first data source and a third data flow associated with the volume of the second data source. As exemplified by the data pipes associated with audio from the first and second data sources, two or more data sources may include the same type of data pipe, but the data flows within the same type of data pipe may differ between data sources. In accordance with the embodiment of FIG. 1, the computing device that includes the second data source also includes the second data target. As such, the second data bridge connection may be established between the connector apparatus and the second data target. This second data bridge connection may include a single data pipe associated with the temperature which, in turn, may not include any data flow since none of the data sources provide temperature data. While the system of FIG. 1 provides a variety of examples of data bridge connections, data pipes and data flows, these examples are provided by way of illustration, but not of the limitation since the connector apparatus and associated method support the establishment of a wide variety of data bridge connections with a wide variety of data sources and data targets and a correspondingly wide variety of data pipes and data flows.

Figure 3:
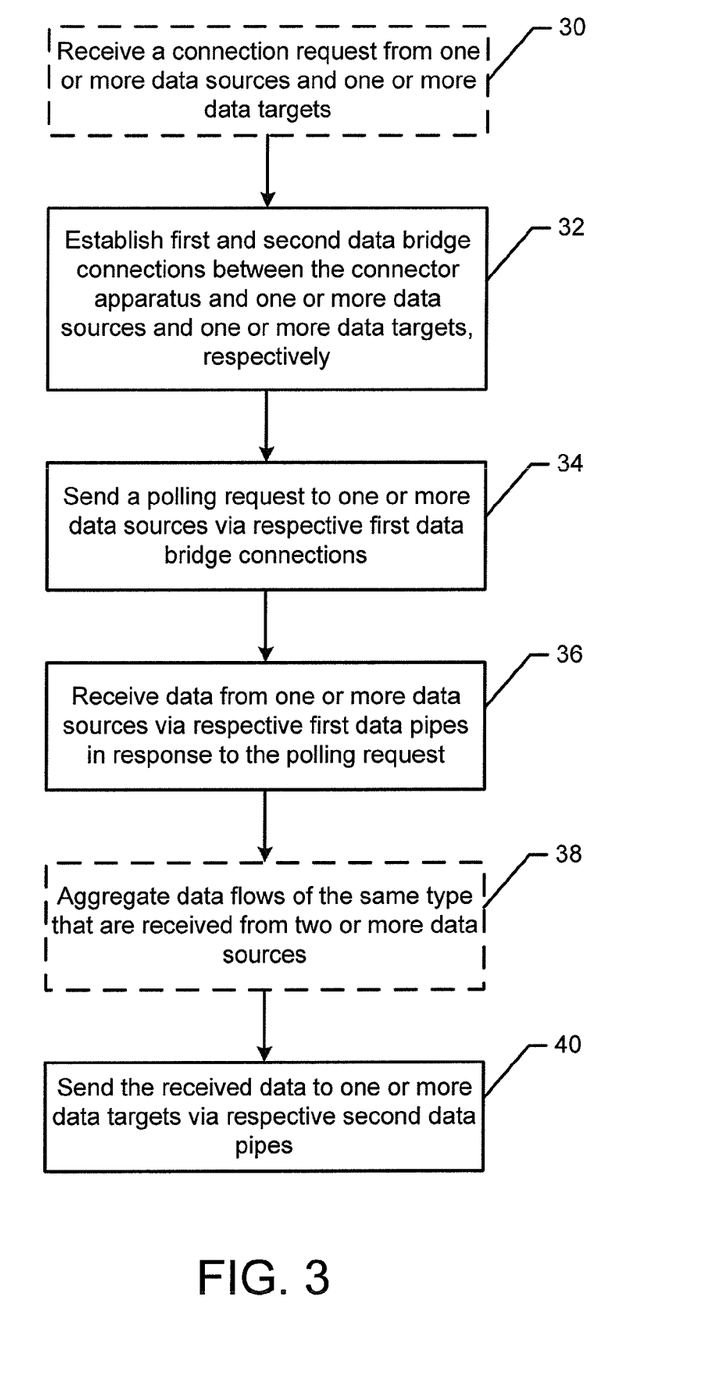
FIG. 3 is a flowchart illustrating operations performed in accordance with an example embodiment of the present invention.

Referring now to block 32 of FIG. 3, the connector apparatus 14, such as the processing circuitry 22, the processor 24, the communication interface 28 or the like, may establish a first data bridge connection with one or more data sources 10. For example, a plurality of first data bridge connections may be established between the connector apparatus and respective ones of a plurality of data sources. In one embodiment, a first data bridge connection may be established based at least in part on a connection request from a data source. As such, the connector apparatus, such as the processing circuitry, the processor, the communication interface or the like, may receive a connection request from one or more data sources as shown in block 30 and may then establish one or more first data bridge connections with the data source(s) based upon the connection request. The connection request may include a destination marker and connection information. The destination marker is a unique value that identifies the data source with respect to other data sources, data targets 12 and the connector apparatus. In an embodiment in which a single device includes both a data source and a data target, the same destination marker may be utilized to identify both the data source and the data target of the same device. The connection information provides information regarding the establishment of a physical communication connection with the respective data source. As such, the connection information may be dependent upon the manner in which the first data bridge connection is to be implemented. For example, in an instance in which the data bridge connection is implemented in JAVA, the connection information may include the host name and port number to facilitate the establishment of the data bridge connection. It is noted, however, that the various data bridge connections may be implemented in different manners with, for example, a first data bridge connection between the connector apparatus and the first data source being implemented in JAVA and a first data bridge connection between the connector apparatus and the second data source being implemented in C++.

In addition to uniquely identifying the data source 10 and providing connection information to facilitate the establishment of a physical communication connection with the connector apparatus 14, a data source may include a specification for the data pipe with a connection request including a definition of one or more data flows that are to be associated with the respective data pipe. In this regard, a data source that is in the process of establishing a first data bridge connection with the connector apparatus may provide the name or other identification for each data pipe for which the data source will be providing data including an identification of each data flow within the respective data pipe via which data of a particular data type will be sent. Based upon the connection request from a data source including, for example, the destination marker uniquely identifying the data source, connection information providing details regarding the establishment of the physical communication connection and the specification of each data pipe to be established between the data source and the connector apparatus including an identification of each data flow that is associated with each respective data pipe, a first data bridge connection may be established between connector apparatus and the data source.

As also shown in block 32 of FIG. 3, the connector apparatus 14, such as the processing circuitry 22, the processor 24, the communication interface 28 or the like, may establish a second data bridge connection with one or more data targets 12. For example, a plurality of second data bridge connections may be established between the connector apparatus and respective ones of a plurality of data targets. In one embodiment, each data target may provide a connection request to the connector apparatus to request the establishment of the second data bridge connection therewith. See block 30 of FIG. 3. As described above in conjunction with the data source 10, the connection request from a data target may include a destination marker uniquely identifying the data target, connection information providing details regarding the establishment of a physical communication connection with the data target and a specification of one or more second data pipes to be established between the connector apparatus and the data target including an identification of one or more data flows associated with each data pipe. As noted above, each data pipe has an associated context and each data flow allows data of a particular type to be sent to the data target.

By defining the data flows associated with a second data pipe that is to be established between the connector apparatus 14 and a data target 12, the connection request that is provided by the data target serves as a subscription to data of a particular data type such that the connector apparatus is thereafter configured to identify data of the particular type that is received from any of the data sources 10 and to then provide the data of the particular type to the data target via the second data pipe and, more particularly, via one or more of the data flows of the second data pipe that are dedicated the particular data type. Thus, the connector apparatus of one embodiment not only receives a connection request from a data target regarding the establishment of a second data pipe therewith, but also receives a subscription from the data target to data of a particular type that is to be sent via the second data pipe.

The data target 12 may provide a subscription at any of various levels of detail. For example, the subscription may be for all of the data flows supported by a respective first data pipe such that the second data flows and the associated second particular data types supported by the second data pipe include each of the first data flows and the associated first particular data types supported by the first data pipe. As another example, the subscription may be for one or more specific first data flows supported by a respective first data pipe such that the second data flow(s) and the associated second particular data type(s) supported by the second data pipe are identical to the one or more specific first data flows and the associated first particular data types supported by the first data pipe. As yet another example, the subscription may be for the first data flows that originate with a respective data source 10 as identified, for example, by the respective destination marker such that the second data flows and the associated second particular data types supported by the second data pipe include each of the first data flows and the associated first particular data types received by the connector apparatus 14 from the respective data source.

Figure 4:
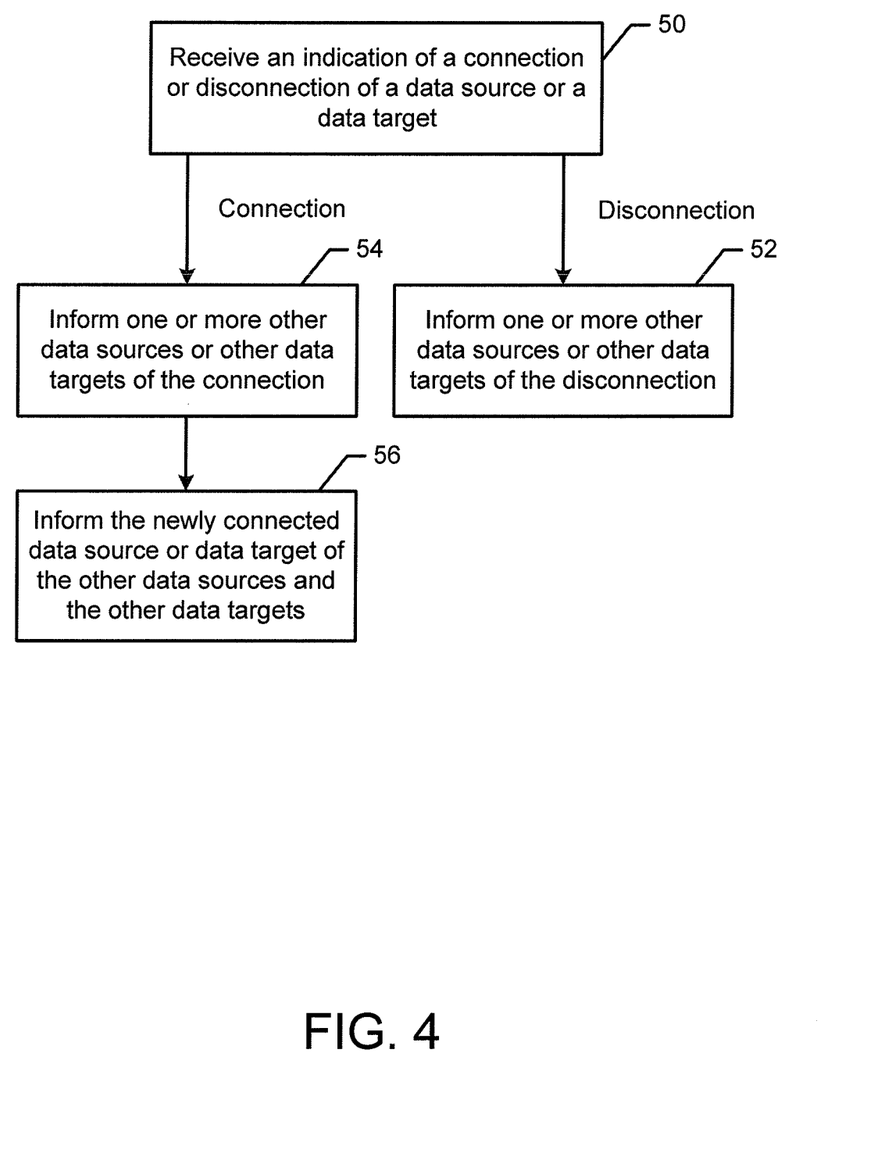
FIG. 4 is a flowchart illustrating operations performed during the connection and/or the disconnection of a data source or a data target in accordance with an example embodiment of the present invention.

In addition to the first and second data pipes established between a connector apparatus 14 and data source(s) 10 and data target(s) 12, respectively, the first and second data bridge connections between the connector apparatus and the data source(s) and data target(s), respectively, may also include a tally data pipe for providing information regarding the connection to the connector apparatus or the disconnection from the connector apparatus of other data sources and other data targets, as shown in FIG. 4. In this regard, the connector apparatus, such as the processing circuitry 22, the processor 24, the communication interface 28 or the like, may be configured to receive an indication as to a connection or disconnection of a data source or a data target. See block 50 of FIG. 4. In this regard, the indication as to a connection of a data source or a data target to the connector apparatus may be provided by the connection request from the data source or the data target, as described above. Further, the indication as to the disconnection of a data source or a data target may be provided in response to a disconnection notification provided by a data source or a data target to the connector apparatus. In response to receiving the indication regarding a connection or disconnection of a data source or a data target, the connector apparatus, such as the processing circuitry, the processor, the communication interface or the like, may inform one or more other data sources or one or more other data targets of the connection or disconnection. See blocks 52 and 54 of FIG. 4. In this regard, the connector apparatus may signal each of the remaining data sources and data targets via the data bridge connection established therewith and, in one embodiment, via a tally lane of the data bridge connection established therewith such that each of the remaining data sources and data targets may maintain an updated record of the other data sources and data targets that remain in communication with the connector apparatus. In the case of a connection, the connector apparatus, such as the processing circuitry, the processor, the communication interface or the like, may also inform the newly connected data source or data target of the other data source(s) and data target(s) that are in communication with the connector apparatus. See block 56 of FIG. 4.

In one example in which data sources 1 and 2 and data targets 1 and 2 are connected to a connector apparatus 14 prior to the disconnection of data source 2 from the connector apparatus, the connector apparatus may provide an indication as to the disconnection of data source 2 to data source 1 and data targets 1 and 2. Thereafter, in an instance in which data target 3 connects to the connector apparatus, the connector apparatus may cause information regarding the connection of data target 3 to be provided to data source 1 and data targets 1 and 2. In this embodiment, the connector apparatus may also be configured to provide information to data target 3 regarding the prior connection of data source 1 and data targets 1 and 2 such that each of the data sources and data targets may identify the other data sources and data targets in communication with the connector apparatus. In another example in which devices that are identified as DEVICE_ID_#1 and DEVICE_ID_#2 connect to the connector apparatus and a device identified as DEVICE_ID_#3 disconnects from the connector apparatus, the connector apparatus may issue the following message:

```
<CONNECT>
 <[DEVICE_ID_#1 />
 <[DEVICE_ID_#2 />
 ...
</CONNECT>
<DISCONNECT>
 <[DEVICE_ID_#3 />
 ...
</DISCONNECT>
```

Once the data bridge connections have been established with the data source(s) 10 and the data target(s) 12, respectively, the connector apparatus 14, such as the processing circuitry 22, the processor 24, the communication interface 28 or the like, may be configured to send a polling request to one and, more particularly, each of the data sources via the respective first data bridge connections. See block 34 of FIG. 3. The connector apparatus may send the polling request on a periodic basis, in response to a predefined event or in other manners. The polling request is configured to trigger the data sources to provide any data having a context that matches the context of the data pipe that is established with the connector apparatus. In this regard, a polling request may relate to data having a predefined context, such as data that would be transmitted via a data pipe associated with the predefined context. As such, the number of polling requests provided by the connector apparatus 14 and thus the number of received data structures provided by a data source 10 for a single polling iteration is at most equal to the number of data pipes via which the data source is connected to the connector apparatus. The data that is provided in response to a polling request may be all data from the data source that has a context that matches the context of the data pipe that is established with the connector apparatus or all new data, that is, data that has not previously be provided by the data source to the connector apparatus, that has a context that matches the context of the data pipe that is established with the connector apparatus.

As such, the connector apparatus 14, such as the processing circuitry 22, the processor 24, the communication interface 28 or the like, may, in turn, be configured to receive data from one or more of the data sources 10 over the respective data pipes in response to the polling request. See block 36 of FIG. 3. The data that is received from a data source may be structured in various manners. In one embodiment, however, the data that is received by the connector apparatus from a data source has a received data structure that includes a context identifier, one or more data flow identifiers and one or more data values. In this regard, the context identifier may be provided by the data pipe through which the data is provided since the data pipe is, in turn, associated with a respective context. Additionally, the data flow identifiers may serve to identify the data flow within which the data is provided and, in some instances, may be determined implicitly based upon the data flow within which the data is provided. In one example, a message returned by a data source in response to a polling request may be:

```
<[CONTEXT]>
 <[DATA_NAME]>[DATA_VALUE]</[DATA_NAME]>
 ...
</[CONTEXT]>
```

In an instance in which a data source does not have any data that is responsive to the polling request, the data source need not provide any data and the connector apparatus may, in turn, not receive any data in response to the polling request.

The connector apparatus 14, such as the processing circuitry 22, the processor 24, the communication interface 28 or the like, may be configured to determine which of the data targets 12 with which the data should be shared, that is, to determine which of the data targets have subscribed to data of the particular type provided by the data sources in response to the polling request. In this regard, the connector apparatus, such as a processing circuitry, the processor, the communication interface or the like, may be configured to determine which of the data targets are connected to the connector apparatus with a second data bridge connection that includes a data pipe having the same context and a data flow of the same particular data type as the data provided by the data source. In this regard, the connector apparatus, such as the processing circuitry, the processor, the communication interface or the like, may be able to appropriately determine the data targets to which the data should be routed based upon the received data structure which provides both a context identifier and one or more data flow identifiers.

The connector apparatus 14, such as the processing circuitry 22, the processor 24, the communication interface 28 or the like, may then be configured to send the received data to each data target 12 that is connected to the connector apparatus by a data pipe having the same context and a data flow of the same particular data type as the data provided by the data source 10. See block 40 of FIG. 3. In other words, in an instance in which the first particular data type with which the data flow over which the data provided by the data source was provided is dedicated is identical to the second particular data type to which a data flow over which the data is to be sent to a data target is dedicated, the connector apparatus, such as the processing circuitry, the processor, the communication interface or the like, may be configured to send the data to the data target over a data pipe including the data flow of the second particular data type. As such, the connector apparatus may effectively distribute the data provided by the data source to each of the data targets that has expressed an interest in, e.g., subscribed to, data of the same type. The number of data structures that the connector apparatus sends and a data target receives for a single polling iteration is at most equal to the number of data pipes that via which the data target is connected to the connector apparatus.

The data flow of the data pipes via which the connector apparatus 14 is in communication with the data sources 10 need not be coextensive with the data flows of the data pipes via which the connector apparatus is in communication with the data targets 12. Thus, a data source may provide data of a particular data type that is not subscribed to by any data target such that the data is not sent by the connector apparatus to any of the data targets. With respect to the example embodiment of FIG. 1, data source 1 provides data having a video context, but none of the data targets subscribes to receive data having a video context. Similarly, a data target may subscribe to data of a particular data type that is not provided by any of the data sources such that the connector apparatus does not provide the data target with any data of the particular data type. Again, with respect to the example embodiment of FIG. 1, data targets 1 and 2 subscribe to receive data having a temperature context, but none of the data sources provide data having a temperature context.

Although the connector apparatus 14 may poll a specific data source 10, the connector apparatus, such as the processing circuitry 22, the processor 24, the communication interface 28 or the like, may be configured to send the polling request a plurality of data sources, such as to each of the data sources with which the connector apparatus is in communication, via respective first data bridge connections. In this embodiment, the connector apparatus, such as the processing circuitry, the processor, the communication interface or the like, may be configured to receive data from the plurality of data sources over respective data pipes in response to the polling request. In one embodiment, the connector apparatus, such as the processing circuitry, the processor, the communication interface or the like, may aggregate data flows of the same type that are received from two or more data sources. See block 38 of FIG. 3. The connector apparatus, such as the processing circuitry, the processor, the communication interface or the like, may then send the aggregated data flows to one or more data targets 12 via respective second data bridge connections. As such, the data collected from the plurality of data sources may be more efficiently distributed to the data targets and, in turn, more efficiently processed and/or stored by the data targets as a result of the aggregation the data flows of the same type. The connector apparatus, such as the processing circuitry, the processor, the communication interface or the like, may aggregate the data received from a plurality of data sources in various manners including aggregation by source device, as opposed to data type, in other embodiments.

By way of example in which data of a particular type is received from two data sources 10, namely, device_ID_#1 and device_ID_#2, and a second particular type of data is received from a single data source, namely, device_ID_#1, the data may be broadcast by the connector apparatus 14 to the data targets 12 following aggregation (by data type) as follows:

```
<[CONTEXT]>
  <[DATA_NAME_#1]>
    <[DEVICE_ID_#1]>[DATA_VALUE]</[DEVICE_ID_#1]>
    <[DEVICE_ID_#2]>[DATA_VALUE]</[DEVICE_ID_#2]>
    ...
  </[DATA_NAME_#1]>
  <[DATA_NAME_#2]>
    <[DEVICE_ID_#1]>[DATA_VALUE]</[DEVICE_ID_#1]>
  </[DATA_NAME_#2]>
</[CONTEXT]>
```

Figure 5:
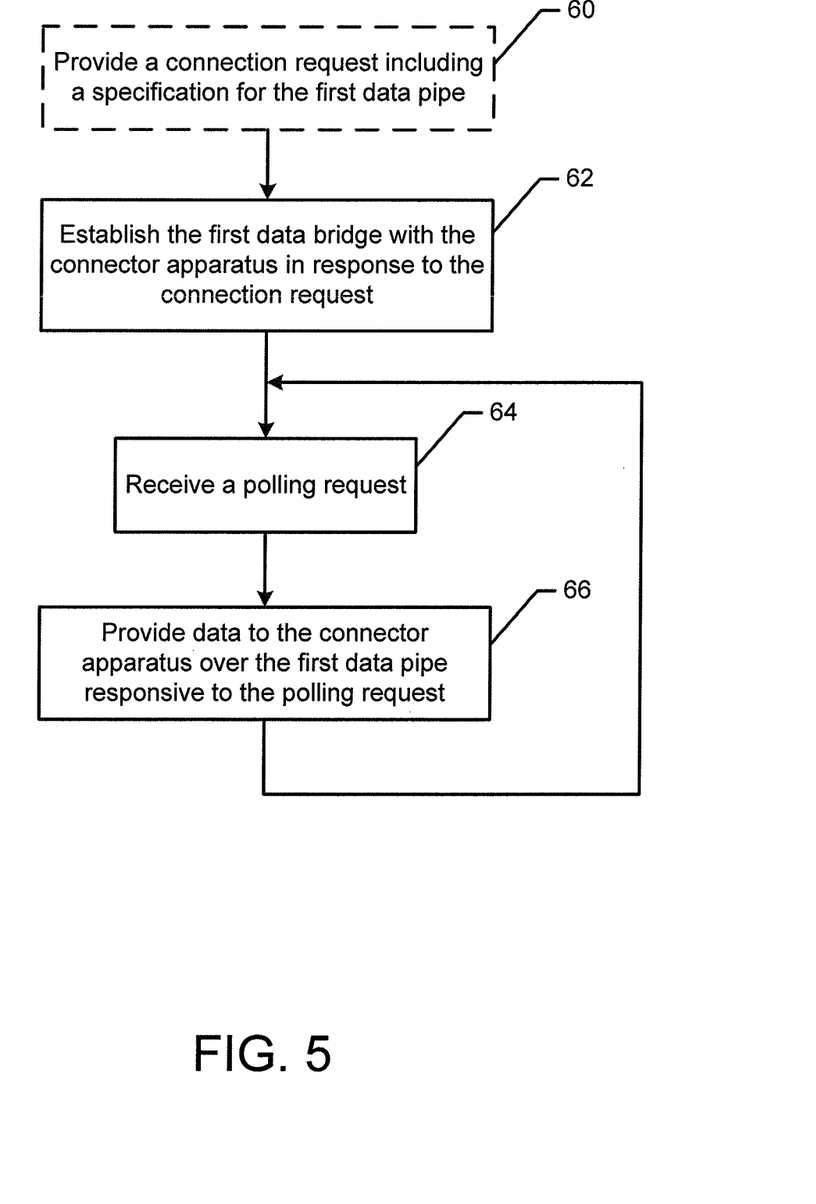
FIG. 5 illustrates the operations performed by a data source in accordance with an example embodiment of the present invention.

Referring now to FIG. 5, the operations performed by a data source 10 in accordance to one embodiment of the present invention are illustrated. In this regard, a data source, such as the processing circuitry 22, the processor 24, the communication interface 28 or the like, may initially provide a connection request to the connector apparatus 14. See block 60. The connection request may uniquely identify the data source, such as by means of a device marker, may provide connection information regarding the establishment of a physical communication connection therewith and may specify the data pipe including the one or more data flows associated with the data pipe to be established with the connector apparatus. Based upon the connection request, the data source, such as the processing circuitry, the processor, the communication interface or the like, may cooperate with the connector apparatus to establish a first data bridge connection. See block 62.

The data source 10 may then await a polling request. In response to a polling request provided by the connector apparatus 14 via the first data bridge connection, the data source, such as the processing circuitry 22, the processor 24, the communication interface 28 or the like, may identify the data responsive to the polling request, such as the data having the same context as the data pipe via which the data is to be provided, that has not previously been provided to the connector apparatus. See block 64 of FIG. 5. The data source, such as the processing circuitry, the processor, the communication interface or the like, may then provide the requested data via the data pipe and, more particularly, via one or more data flows within the respective data pipe. See block 66. As described above, each data flow includes data of a particular data type with each data flow within the data pipe having the same context as associated with the data pipe. Thus, the data structure provided by the data source may have a received data structure including the context identifier, one or more data flow identifiers and one or more data values. Although not shown in FIG. 5, the data source may also receive tally information from the connector apparatus identifying the connection or disconnection of other data sources and data targets 12 to the connector apparatus such that the data source may maintain a current record of the data sources and data targets with which the connector apparatus is in communication.

Figure 6:
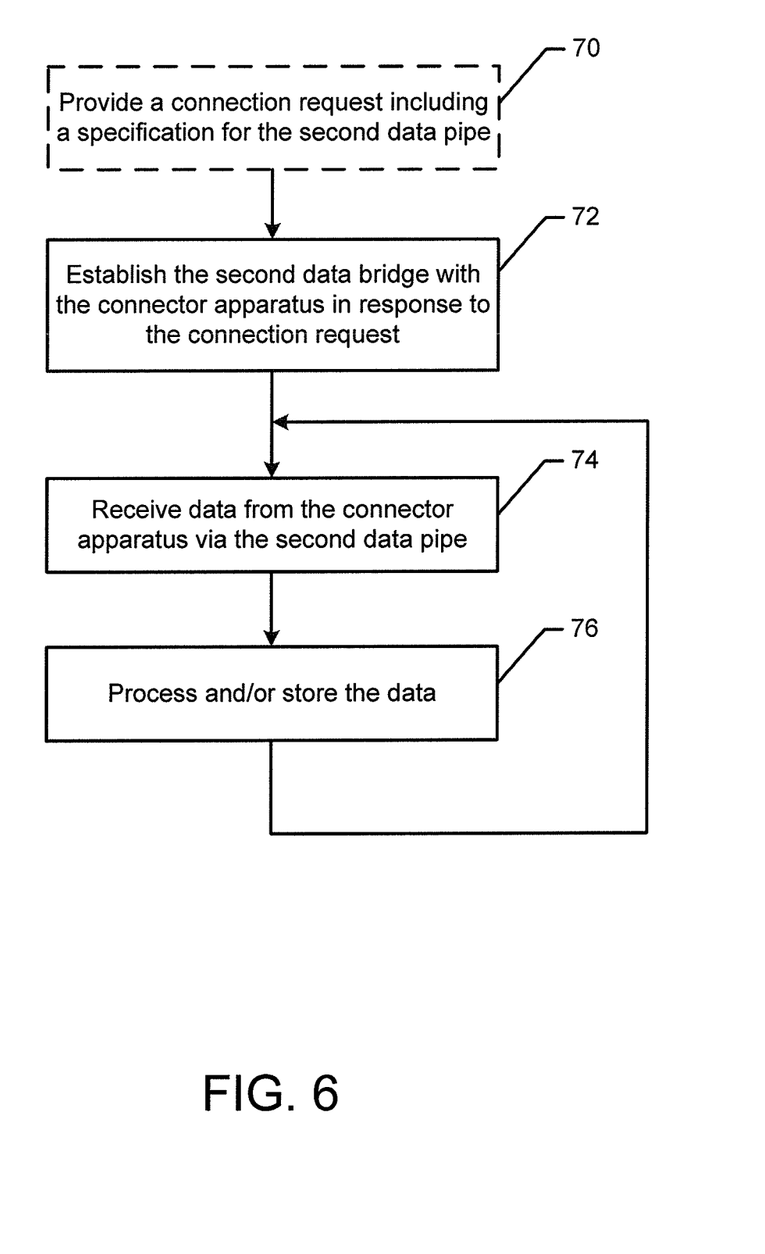
FIG. 6 illustrates the operations performed by a data target in accordance with an example embodiment of the present invention.

With respect to FIG. 6 from the perspective of a data target 12, a data target, such as the processing circuitry 22, the processor 24, the communication interface 28 or the like, may initially provide a connection request to the connector apparatus 14. See block 70. The connection request may uniquely identify the data target, such as by means of a device marker, may provide connection information regarding the establishment of a physical communication connection therewith and may specify the data pipe including the one or more data flows associated with the data pipe to be established with the connector apparatus. Based upon the connection request, the data target, such as the processing circuitry, the processor, the communication interface or the like, may cooperate with the connector apparatus to establish a second data bridge connection. See block 72.

The data target 12 may then await the broadcast of data via the second data bridge connection established with the connector apparatus 14. In this regard, the data target, such as the processing circuitry 22, the processor 24, the communication interface 28 or the like, may receive data via a second data pipe and, more particularly, via one or more data flows within the second data pipe. See block 74 of FIG. 6. The data may originate with one or more data sources 10 and, in one embodiment, may have been aggregated by the connector apparatus. The data may be received in accordance with a data structure that includes a context identifier, such as defined by the data pipe through which the data is provided, one or more data flow identifiers and one or more data values. As shown in block 76, the data target, such as the processing circuitry, the processor, the communication interface or the like, may thereafter process and/or store the data.

By way of example with respect to the capture, processing, sharing and storing of medical images, the data pipes and associated data flows established by a connector apparatus 14 between a plurality of data sources 10 embodied by an MRM RIS client machine, an HMI PACS client machine and a McKesson Cardiology (MC) cardiovascular information system (CVIS) client machine and a data target 12 embodied by a server may be defined as follows:

MRM RIS Client Machine:
Data source
Device ID=RIS1
Data Pipe=MRM:
   Data Flow=Patient In Context
   Data Flow=Active Page
Data Pipe=OS:
   Data Flow=Version
HMI PACS Client Machine:
Data source
Device ID=PACS1
Data Pipe=HMI
   Data Flow=Patient In Context
   Data Flow=Active Image
Data Pipe=OS
   Data Flow=Version
MC CVIS Client Machine:
Data source
Device ID=CVIS1
Data Pipe=MC
   Data Flow=Patient In Context
   Data Flow=Active Page
Server:
Data target
Device ID=SVR1
Data Pipe=MRM, HMI, MC, OS In this embodiment, the messages exchanged by the connector apparatus 14, the data sources 10 and the data target 12 to bring about the following steps are relating to connection, polling, broadcasting and disconnection are as follows:

```
1) RIS1 connects to connector apparatus
2) SVR1 connects to connector apparatus
3) Polling/Broadcasting Iteration:
       RIS1 Tally Information:
           <CONNECT>
               <SVR1 />
           </CONNECT>
       SVR1 Tally Information:
           <CONNECT>
               <RIS1 />
           </CONNECT>
       RIS1 Polls:
           <MRM>
               <PATIENT_IN_CONTEXT>
               ABC</PATIENT_IN_CONTEXT>
               <ACTIVE_PAGE>
               TRANSCRIPTION</ACTIVE_PAGE>
           </MRM>
           <OS>
               <VERSION>WIN2K3</VERSION>
           </OS>
       SVR1 Broadcasts:
           <MRM>
               <PATIENT_IN_CONTEXT>
                   <RIS1>ABC</RIS1>
               </PATIENT_IN_CONTEXT>
               <ACTIVE_PAGE>
                   <RIS1>TRANSCRIPTION</RIS1>
               </ACTIVE_PAGE>
           </MRM>
           <OS>
               <VERSION>
                   <RIS1>WIN2K3</RIS1>
               </VERSION>
           </OS>
4) PACS1 connects to connector apparatus
5) Polling/Broadcasting Iteration:
       RIS1 Tally Information:
           <CONNECT>
               <PACS1 />
           </CONNECT>
       PACS1 Tally Information:
           <CONNECT>
               <RIS1 />
               <SVR1 />
           </CONNECT>
       SVR1 Tally Information:
           <CONNECT>
               <PACS1 />
           </CONNECT>
       RIS1 Polls:
           <MRM>
               <PATIENT_IN_CONTEXT>
               ABC</PATIENT_IN_CONTEXT>
               <ACTIVE_PAGE>
               TRANSCRIPTION</ACTIVE_PAGE>
           </MRM>
           <OS>
               <VERSION>WIN2K3</VERSION>
           </OS>
       PACS1 Polls:
           <HMI>
               <PATIENT_IN_CONTEXT>
               MNO</PATIENT_IN_CONTEXT>
               <ACTIVE_IMAGE>
               CT HEAD</ACTIVE_IMAGE>
           </HMI>
           <OS>
               <VERSION>WIN2K8</VERSION>
           </OS>
       SVR1 Broadcasts:
           <MRM>
               <PATIENT_IN_CONTEXT>
                   <RIS1>ABC</RIS1>
               </PATIENT_IN_CONTEXT>
               <ACTIVE_PAGE >
                   <RIS1>TRANSCRIPTION</RIS1>
               </ACTIVE_PAGE>
           </MRM>
           <HMI>
               <PATIENT_IN_CONTEXT>
                   <PACS1>MNO</PACS1>
               </PATIENT_IN_CONTEXT>
               <ACTIVE_IMAGE>
                   <PACS1>CT HEAD</PACS1>
               </ACTIVE_IMAGE>
           </HMI>
           <OS>
               <VERSION>
                   <RIS1>WIN2K3</RIS1>
                   <PACS1>WIN2K8</PACS1>
               </VERSION>
           </OS>
6) CVIS1 connects to connector apparatus
7) RIS1 changes "Patient In Context" to "DEF", "Active Page" to "DICTATION"
8) PACS1 changes "Patient In Context" to "PQR"
9) Polling/Broadcasting Iteration:
       RIS1 Tally Information:
           <CONNECT>
               <CVIS1 />
           </CONNECT>
       PACS1 Tally Information:
           <CONNECT>
               <CVIS1 />
```

```
        </CONNECT>
CVIS1 Tally Information:
        <CONNECT>
                <RIS1 />
                <PACS1 />
                <SVR1 />
        </CONNECT>
SVR1 Tally Information:
        <CONNECT>
                <CVIS1 />
        </CONNECT>
RIS1 Polls:
        <MRM>
                <PATIENT_IN_CONTEXT>
                DEF</PATIENT_IN_CONTEXT>
                <ACTIVE_PAGE>
                DICTATION</ACTIVE_PAGE>
        </MRM>
        <OS>
                <VERSION>WIN2K3</VERSION>
        </OS>
PACS1 Polls:
        <HMI>
                <PATIENT_IN_CONTEXT>
                PQR</PATIENT_IN_CONTEXT>
                <ACTIVE_IMAGE>
                CT HEAD</ACTIVE_IMAGE>
        </HMI>
        <OS>
                <VERSION>WIN2K8</VERSION>
        </OS>
CVIS1 Polls:
        <MC>
                <PATIENT_IN_CONTEXT>
                </PATIENT_IN_CONTEXT>
                <ACTIVE_PAGE>
                LOGIN</ACTIVE_PAGE>
        </MC>
SVR1 Broadcasts:
        <MRM>
                <PATIENT_IN_CONTEXT>
                        <RIS1>DEF</RIS1>
                </PATIENT_IN_CONTEXT>
                <ACTIVE_PAGE >
                        <RIS1>DICTATION</RIS1>
                </ACTIVE_PAGE>
        </MRM>
        <HMI>
                <PATIENT_IN_CONTEXT>
                        <PACS1>PQR</PACS1>
                </PATIENT_IN_CONTEXT>
                <ACTIVE_IMAGE>
                        <PACS1>CT HEAD</PACS1>
                </ACTIVE_IMAGE>
        </HMI>
        <MC>
                <PATIENT_IN_CONTEXT>
                        <CVIS1></CVIS1>
                </PATIENT_IN_CONTEXT>
                <ACTIVE_PAGE >
                        <CVIS1>LOGIN</CVIS1>
                </ACTIVE_PAGE>
        </MC>
        <OS>
                <VERSION>
                        <RIS1>WIN2K3</RIS1>
                        <PACS1>WIN2K8</PACS1>
                </VERSION>
        </OS>
10) RIS1 disconnects from connector apparatus
11) PACS1 disconnects from connector apparatus
12) CVIS1 changes "Active Page" to "SPLASH"
13) Polling/Broadcasting Iteration:
        CVIS1 Tally Information:
                <DISCONNECT>
                        <RIS1 />
                        <PACS1 />
                </DISCONNECT>
        SVR1 Tally Information:
                <DISCONNECT>
                        <RIS1 />
                        <PACS1 />
                </DISCONNECT>
        CVIS1 Polls:
                <MC>
                        <PATIENT_IN_CONTEXT>
                        </PATIENT_IN_CONTEXT>
                        <ACTIVE_PAGE>
                        SPLASH</ACTIVE_PAGE>
                </MC>
        SVR1 Broadcasts:
                <MC>
                        <PATIENT_IN_CONTEXT>
                                <CVIS1></CVIS1>
                        </PATIENT_IN_CONTEXT>
                        <ACTIVE_PAGE >
                                <CVIS1>SPLASH</CVIS1>
                        </ACTIVE_PAGE>
                </MC>
```

As described above, the connector apparatus 14 and the associated method of example embodiments of the present invention facilitate the interaction between devices including the sharing of data, including sensor data, between devices, thereby enhancing cooperation between applications executed by the various devices. Indeed, the connector apparatus and associated method may permit a wide variety of devices to interoperate in conjunction with a wide variety of different types of data, including a wide variety of sensor data, and may support dynamic changes in the devices that are in communication via the connector apparatus, thereby improving the extensibility of the connector apparatus and associated method. By permitting devices and applications executed by the various devices to cooperate in a more seamless and integrated manner, a user may enjoy enhanced functionality.

FIGS. 3-6 are flowcharts illustrating the operations performed by a method, apparatus and computer program product, such as apparatus 20 of FIG. 2, from the perspective of the controller apparatus 14 in regards to FIGS. 3 and 4, from the perspective of a data source in regards to FIG. 5 and from the perspective of a data target 14 in regards to FIG. 6 in accordance with one embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a non-transitory memory 28 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 3-6, when executed, convert a computer or processing circuitry into a particular machine configured to perform an example embodiment of the present invention. Accordingly, the operations of FIGS. 3-6 define an algorithm for configuring a computer or processing circuitry, e.g., processor, to perform an example embodiment. In some cases, a general purpose computer may be provided with an instance of the processor which performs the algorithm of FIGS. 3-6 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

In some embodiments, certain ones of the operations above may be modified or further amplified as described below, such as shown by the blocks having the dashed outline in FIG. 3. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for bridging data between entities, the method comprising:
    establishing a first data bridge connection between a connector apparatus and a data source, the first data bridge connection comprising a first data pipe, wherein the first data pipe is comprised of one or more data flows, each of the one or more data flows associated with the first data pipe being dedicated for sending a first particular data type;
    establishing a second data bridge connection between the connector apparatus and a data target, the second data bridge connection comprising a second data pipe, wherein the second data pipe is comprised of one or more data flows, each of the one or more data flows associated with the second data pipe being dedicated for sending a second particular data type;
    sending a polling request from the connector apparatus to the data source via the first data bridge connection;
    receiving data from the data source over the first data pipe in response to the polling request; and
    sending the received data to the data target over the second data pipe in an instance in which the data target has subscribed to the data received from the data source over the first data pipe.

2. The method of claim 1, wherein establishing the second data bridge connection comprises establishing the second data bridge connection such that the second particular data types supported by the second data pipe include each of the first particular data types supported by the first data pipe.

3. The method of claim 1, wherein establishing the second data bridge connection comprises establishing the second data bridge connection such that one or more of the second particular data types supported by the second data pipe are identical to one or more of the first particular data types supported by the first data pipe.

4. The method of claim 1, wherein establishing the second data bridge connection comprises establishing the second data bridge connection such that all data received from the data source is sent over the second data pipe.

5. The method of claim 1, wherein:
    establishing the first data bridge connection comprises establishing the first data bridge connection based at least in part on a connection request from the data source, the connection request from the first entity including a specification for the first data pipe defining the one or more data flows associated with the first data pipe; and
    establishing the second data bridge connection comprises establishing the second data bridge connection based at least in part on a connection request from the data target, the connection request from the second entity including a specification for the second data pipe defining the one or more data flows associated with the second data pipe.

6. The method of claim 1, wherein establishing the first data bridge connection comprises establishing a plurality of first data bridge connections with respective ones of a plurality of data sources, wherein sending the polling request comprises sending the polling request from the connector apparatus to the plurality of data sources via respective first data bridge connections, wherein receiving data comprises receiving data from the plurality of data sources over respective data pipes in response to the polling request, and wherein the method comprises aggregating data flows of a same type that are received from two or more data sources prior to sending the data to one or more data targets via respective second data bridge connections.

7. The method of claim 1, wherein establishing the second data bridge connection comprises establishing a plurality of second data bridge connections with respective ones of a plurality of data targets, wherein sending the received data to the data target comprises sending the received data to a subset of the data targets including the data targets that are connected to the connector apparatus via second data bridge connections and that have subscribed to the data received from the data source over the first data pipe.

8. The method of claim 1, wherein receiving data from the data source comprises receiving data in accordance with a received data structure including a context identifier, one or more data flow identifiers and one or more data values.

9. The method of claim 1, further comprising:
  receiving an indication as to a connection or a disconnection of a data source or a data target; and
  informing one or more other data sources or one or more other data targets of the connection or the disconnection.

10. A computer program product comprising at least one non-transitory computer-readable storage medium having computer-executable program code portions stored therein, the computer-executable program code portions comprising program code instructions for performing the method of claim 1.

11. A connector apparatus for bridging data between entities, the connector apparatus comprising a processing circuitry configured to:
  establish a first data bridge connection with a data source, the first data bridge connection comprising a first data pipe, wherein the first data pipe is comprised of one or more data flows, each of the one or more data flows associated with the first data pipe being dedicated for sending a first particular data type;
  establish a second data bridge connection with a data target, the second data bridge connection comprising a second data pipe, wherein the second data pipe is comprised of one or more data flows, each of the one or more data flows associated with the second data pipe being dedicated for sending a second particular data type;
  send a polling request to the data source via the first data bridge connection;
  receive data from the data source over the first data pipe in response to the polling request; and
  send the received data to the data target over the second data pipe in an instance in which the data target has subscribed to the data received from the data source over the first data pipe.

12. The connector apparatus of claim 11, wherein the processor circuitry is configured to establish the second data bridge connection by establishing the second data bridge connection such that the second particular data types supported by the second data pipe include each of the first particular data types supported by the first data pipe.

13. The connector apparatus of claim 11, wherein the processor circuitry is configured to establish the second data bridge connection by establishing the second data bridge connection such that one or more of the second particular data types supported by the second data pipe are identical to one or more of the first particular data types supported by the first data pipe.

14. The connector apparatus of claim 11, wherein the processor circuitry is configured to establish the second data bridge connection by establishing the second data bridge connection such that all data received from the data source is sent over the second data pipe.

15. The connector apparatus of claim 11, wherein the processing circuitry is configured to establish the first data bridge connection by establishing the first data bridge connection based at least in part on a connection request from the data source, the connection request from the first entity including a specification for the first data pipe defining the one or more data flows associated with the first data pipe, and wherein the processing circuitry is configured to establish the second data bridge connection by establishing the second data bridge connection based at least in part on a connection request from the data target, the connection request from the second entity including a specification for the second data pipe defining the one or more data flows associated with the second data pipe.

16. The connector apparatus of claim 11, wherein the processing circuitry is configured to establish the first data bridge connection by establishing a plurality of first data bridge connections with respective ones of a plurality of data sources, wherein the processing circuitry is configured to send the polling request by sending the polling request to the plurality of data sources via respective first data bridge connections, wherein the processing circuitry is configured to receive data by receiving data from the plurality of data sources over respective data pipes in response to the polling request, and wherein the connector apparatus is further configured to aggregate data flows of a same type that are received from two or more data sources prior to sending the data to one or more data targets via respective second data bridge connections.

17. The connector apparatus of claim 11, wherein the processing circuitry is configured to establish the second data bridge connection by establishing a plurality of second data bridge connections with respective ones of a plurality of data targets, wherein the processing circuitry is configured to send the received data to the data target by sending the received data to a subset of the data targets including the data targets that are connected to the connector apparatus via second data bridge connections and that have subscribed to the data received from the data source over the first data pipe.

18. A system for bridging data between entities, the system comprising:
  a connector apparatus;
  a data source connected to the connector apparatus via a first data bridge connection, the first data bridge connection comprising a first data pipe, wherein the first data pipe is comprised of one or more data flows, each of the one or more data flows associated with the first data pipe being dedicated for sending a first particular data type; and
  a data target connected to the connector apparatus via a second data bridge connection, the second data bridge connection comprising a second data pipe, wherein the second data pipe is comprised of one or more data flows, each of the one or more data flows associated with the second data pipe being dedicated for sending a second particular data type,
  wherein the connector apparatus is configured to send a polling request to the data source via the first data bridge connection,
  wherein the data source is configured to provide data to the connector apparatus over the first data pipe in response to the polling request, and
  wherein the connector apparatus is further configured to send the received data to the data target over the second data pipe in an instance in which the data target has subscribed to the data received from the data source over the first data pipe.

19. The system of claim 18, further comprising a plurality of data sources connected to the connector apparatus via respective ones of a plurality of first data bridge connections, wherein the connector apparatus is configured to send the polling request to the plurality of data sources via respective first data bridge connections, wherein the plurality of data sources are configured to provide data over respective data pipes in response to the polling request, and wherein the connector apparatus is further configured to aggregate data flows of a same type that are received from two or more data sources prior to sending the data to one or more data targets via respective second data bridge connections.

20. The system of claim 18, further comprising a plurality of data targets connected to the connector apparatus via respective ones of a plurality of second data bridge connections, wherein the connector apparatus is configured to send the received data to a subset of the data targets including the data targets that are connected to the connector apparatus via second data bridge connections and that have subscribed to the data received from the data source over the first data pipe.

* * * * *